US005630098A

United States Patent [19]
Vermeer et al.

[11] Patent Number: 5,630,098
[45] Date of Patent: May 13, 1997

[54] SYSTEM AND METHOD FOR INTERLEAVING MEMORY ADDRESSES BETWEEN MEMORY BANKS BASED ON THE CAPACITY OF THE MEMORY BANKS

[75] Inventors: Fulps V. Vermeer, Nieuwegein, Netherlands; Edward C. King, Fremont, Calif.

[73] Assignee: NCR Corporation, Dayton, Ohio

[21] Appl. No.: 752,702

[22] Filed: Aug. 30, 1991

[51] Int. Cl.[6] .................................................. G06F 12/06
[52] U.S. Cl. .................. 395/497.03; 395/484; 395/402; 395/405
[58] Field of Search .... 395/425 MS; 364/200 MS File, 364/900 MS File

[56] References Cited

U.S. PATENT DOCUMENTS

| | | | |
|---|---|---|---|
| 3,806,881 | 4/1974 | Miwa et al. | 395/405 |
| 4,056,845 | 11/1977 | Churchill, Jr. | 395/454 |
| 4,254,463 | 3/1981 | Busby et al. | 395/405 |
| 4,280,176 | 7/1981 | Tan | 395/405 |
| 4,740,911 | 4/1988 | Shar et al. | 395/484 |
| 4,924,375 | 5/1990 | Fung et al. | 395/484 |
| 4,949,298 | 8/1990 | Nakanishi et al. | 395/402 |
| 4,980,822 | 12/1990 | Brantley, Jr. et al. | 395/412 |
| 4,980,850 | 12/1990 | Morgan | 395/497.03 |
| 5,042,003 | 8/1991 | Belt et al. | 395/402 |
| 5,097,437 | 3/1992 | Larson | 395/775 |

Primary Examiner—Tod R. Swann
Assistant Examiner—J. Peikari
Attorney, Agent, or Firm—Douglas S. Foote

[57] ABSTRACT

The invention is a system and method for accessing a plurality of memory banks. The system includes a number of memory banks, a register and a controller. The register stores capacity information of each memory bank. The controller is connected to the register and memory banks and uses the capacity information to determine whether or not addresses are to be interleaved between a pair of memory banks. If the memory banks are of similar capacities, the addresses may be interleaved therebetween.

11 Claims, 7 Drawing Sheets

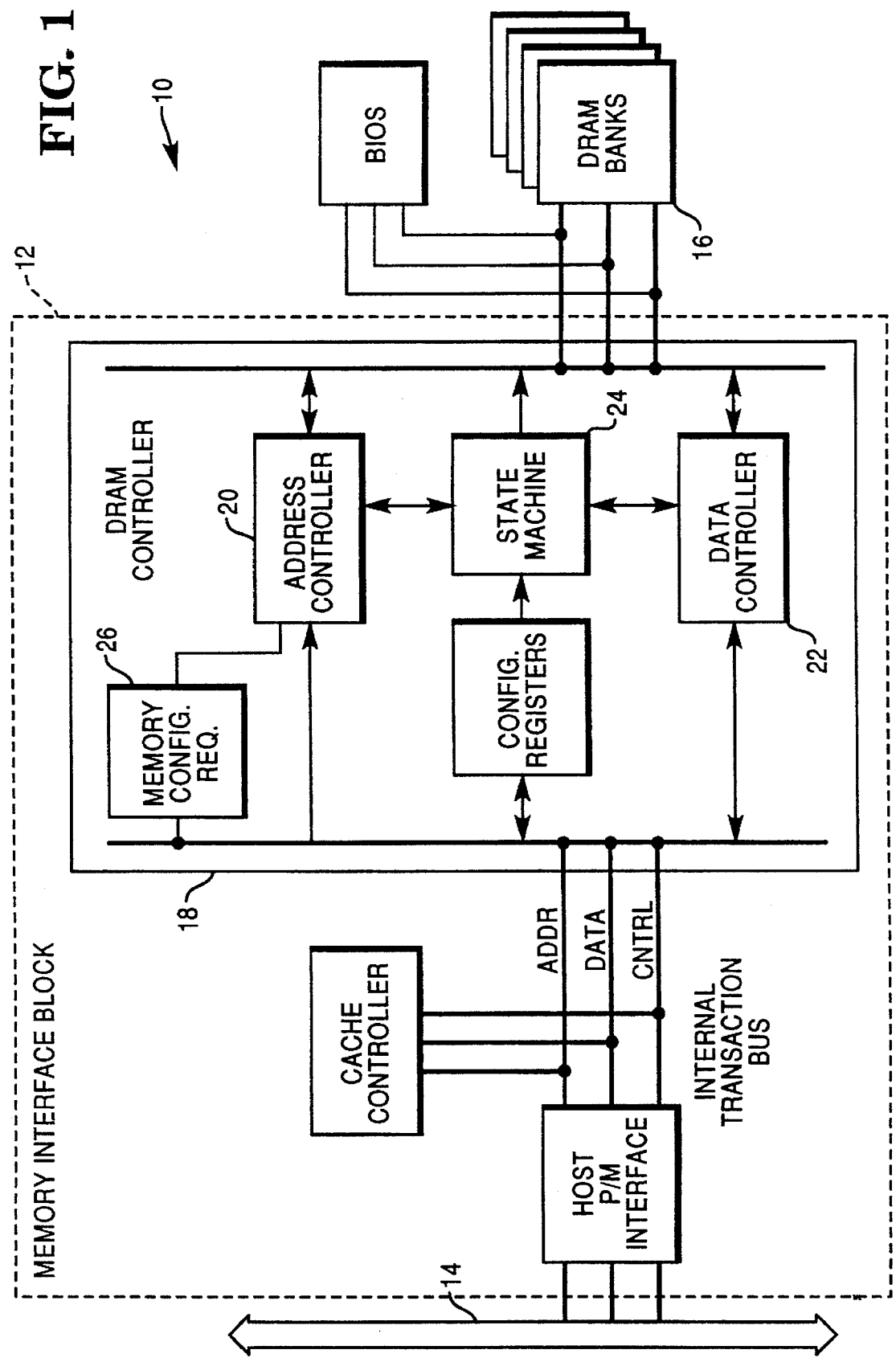

FIG. 3A

| MEMORY SIZE | CONFIGURATION | MEMORY SIZE | CONFIGURATION |
|---|---|---|---|
| 1 MBYTE | QQQQ<br>N.-INT. | 2 MBYTE | QQQQ<br>QQQQ<br>INT. |
| 3 MBYTE | QQQQ<br>QQQQ<br>QQQQ<br>INT./N.-INT. | 4 MBYTE | QQQQ<br>QQQQ<br>QQQQ<br>QQQQ<br>INT. |
| 6 MBYTE | 1 1 1 1<br>QQQQ<br>QQQQ<br>INT./N.-INT. | 8 MBYTE | 1 1 1 1<br>1 1 1 1<br>INT. |
| 10 MBYTE | 1 1 1 1<br>QQQQ<br>QQQQ<br>1 1 1 1<br>INT. | 12 MBYTE | 1 1 1 1<br>1 1 1 1<br>1 1 1 1<br>INT./N.-INT. |
| 16 MBYTE | 1 1 1 1<br>1 1 1 1<br>1 1 1 1<br>1 1 1 1<br>INT. | 20 MBYTE | 1 1 1 1<br>4 4 4 4<br>N. INT. |
| 24 MBYTE | 4 4 4 4<br>1 1 1 1<br>1 1 1 1<br>INT./N.-INT. | 28 MBYTE | 1 1 1 1<br>1 1 1 1<br>1 1 1 1<br>4 4 4 4<br>INT./N.-INT. |

FIG. 3B

| MEMORY SIZE | CONFIGURATION | MEMORY SIZE | CONFIGURATION |
|---|---|---|---|
| 32 MBYTE | 4 4 4 4<br>4 4 4 4<br>INT. | 38 MBYTE | 4 4 4 4<br>1 1 1 1<br>4 4 4 4<br>N.-INT. |
| 40 MBYTE | 4 4 4 4<br>1 1 1 1<br>1 1 1 1<br>4 4 4 4<br>INT. | 48 MBYTE | 4 4 4 4<br>4 4 4 4<br>4 4 4 4<br>INT./N.-INT. |
| 52 MBYTE | 4 4 4 4<br>1 1 1 1<br>4 4 4 4<br>4 4 4 4<br>INT./N.-INT. | 64 MBYTE | 4 4 4 4<br>4 4 4 4<br>4 4 4 4<br>4 4 4 4<br>INT. |

FIG. 3C

| BANK 2 | 9 | 10 | 11 | 12 |
|---|---|---|---|---|
| BANK 0 | 1 | 2 | 3 | 4 |
| BANK 1 | 5 | 6 | 7 | 8 |
| BANK 3 | 13 | 14 | 15 | 16 |

FIG. 6

| 7 | 6 | 5 | 4 | 3 | 2 | 1 | 0 |
|---|---|---|---|---|---|---|---|
| BANK 3 | | BANK 2 | | BANK 1 | | BANK 0 | |

SYSTEM AND METHOD FOR INTERLEAVING MEMORY ADDRESSES BETWEEN MEMORY BANKS BASED ON THE CAPACITY OF THE MEMORY BANKS

The present invention relates to computer memory systems. More specifically, it relates to a system and method for the partial interleaving of memory addresses.

BACKGROUND OF THE INVENTION

A computer memory system typically includes a number of DRAM chips. The access time to these DRAM chips is relatively slow compared to the operating speed of the processor. In order to improve access time, a technique known as "interleaving" may be employed. Interleaving equally divides the DRAM chips into two large banks and stores data elements having successive addresses in alternate banks. By this method one bank can be accessed while the other is being precharged.

Some computer architectures permit multiple DRAM configurations both in the number and capacity of memory chips employed. Interleaving may be disrupted in configurations which allow the user to add more or larger capacity chips. For example, the size of the DRAM chips can change the absolute capacity of a memory bank or the relative size of two banks. Either of these can make a conventional interleaving architecture inoperative.

Non-interleaved systems will transfer data to memory relatively slowly. This can be particularly problematic with newer high performance architectures, such as microchannel, in which a "streaming mode" transfers data on every clock cycle. Memory controllers operating at the same speed as the microchannel are not able to handle streaming mode transfers without interleaving. Furthermore, some memory controllers are unable to handle data transfers on successive clock cycles irrespective of whether the controller is operating in interleaving mode.

OBJECTS OF THE INVENTION

It is therefore an object of the present invention to provide a new and improved computer memory system.

It is another object of the present invention to provide a new and improved method for accessing a plurality of memory banks.

It is a further object of the present invention to provide a system and method for partially interleaving a memory system.

It is yet another object of the present invention to provide a system and method for providing a memory control system with enhanced memory access time.

It is yet a further object of the present invention to provide a memory system having multiple configurations.

It is still another object of the present invention to provide a memory system which is highly compatible with microchannel streaming mode accesses.

SUMMARY OF THE INVENTION

One form of the present invention is a computer memory system comprising a plurality of memory banks, a register and a controller. The register stores capacity information of each bank. The controller is connected to the register and memory banks and uses the capacity information to determine whether or not addresses are to be interleaved between a pair of banks.

Another form of the present invention is a method for accessing a plurality of memory banks. Information on the capacity of each bank is stored, and a determination made from the information as to whether or not addresses are to be interleaved between a pair of memory banks.

BRIEF DESCRIPTION OF THE DRAWINGS

FIG. 1 is a block diagram of a memory system according to the present invention.

FIGS. 3A, 3B and 3C show possible memory configurations for the present invention.

FIG. 6 is a schematic drawing of the memory configuration register shown in FIG. 5.

DESCRIPTION OF A PREFERRED EMBODIMENT

Figure 2A:
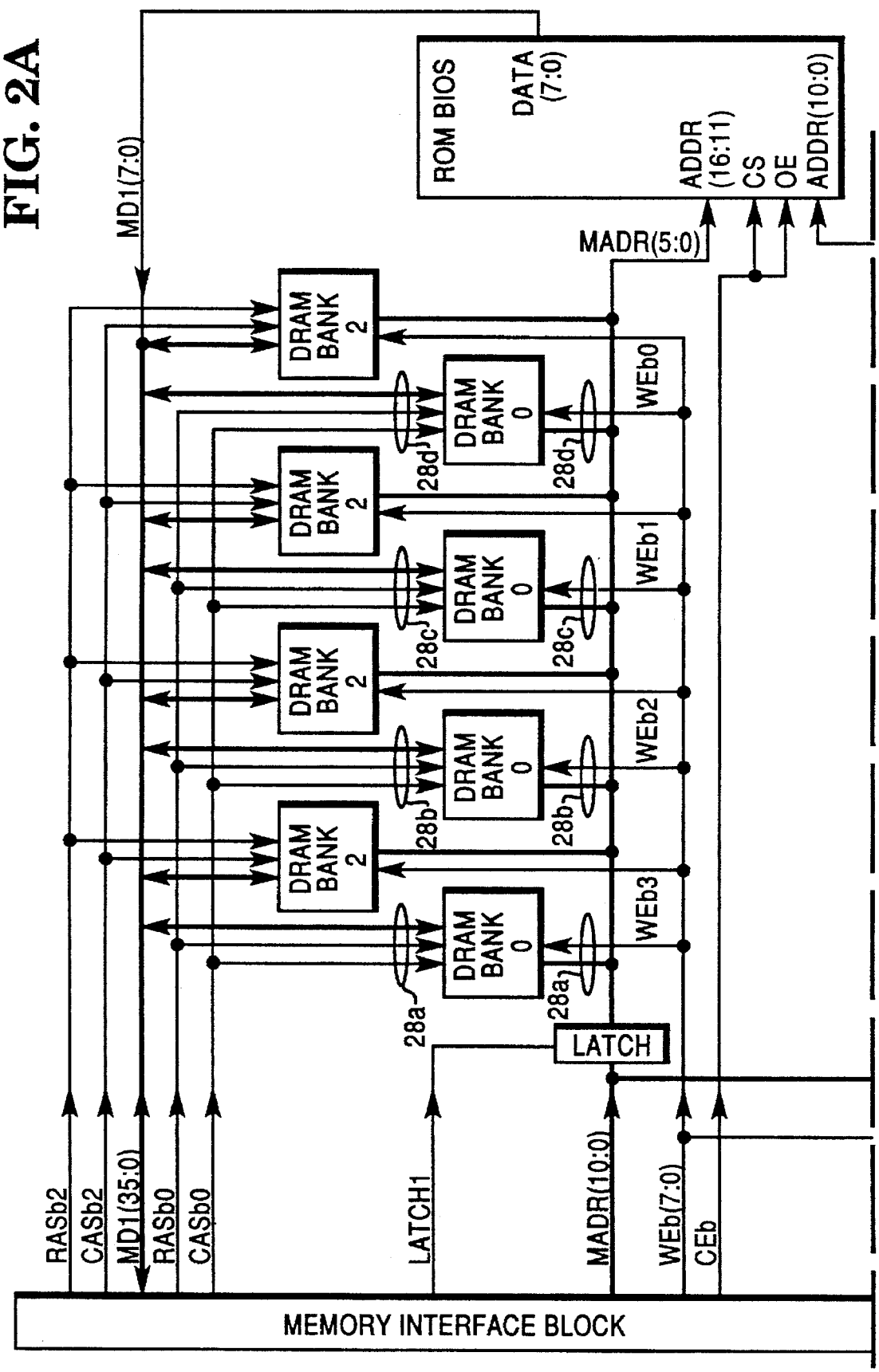
FIGS. 2A and 2B are a block diagram of DRAM memory banks and BIOS ROM shown in FIG. 1.

FIG. 1 shows a memory system 10 having a memory interface block 12 connected between a system bus 14 and DRAM banks 16. Memory interface block 12 includes a DRAM controller 18 which controls addressing and data transfer with DRAM banks 16. System bus 14 is also connected to a processor, peripherals and a microchannel bus controller (not shown).

DRAM controller 18 includes an address controller 20, a data controller 22, a state machine 24 and a memory configuration register 26. Memory configuration register 26 stores information on the capacity of DRAM banks 16 and is connected to address controller 20.

Figure 2B:
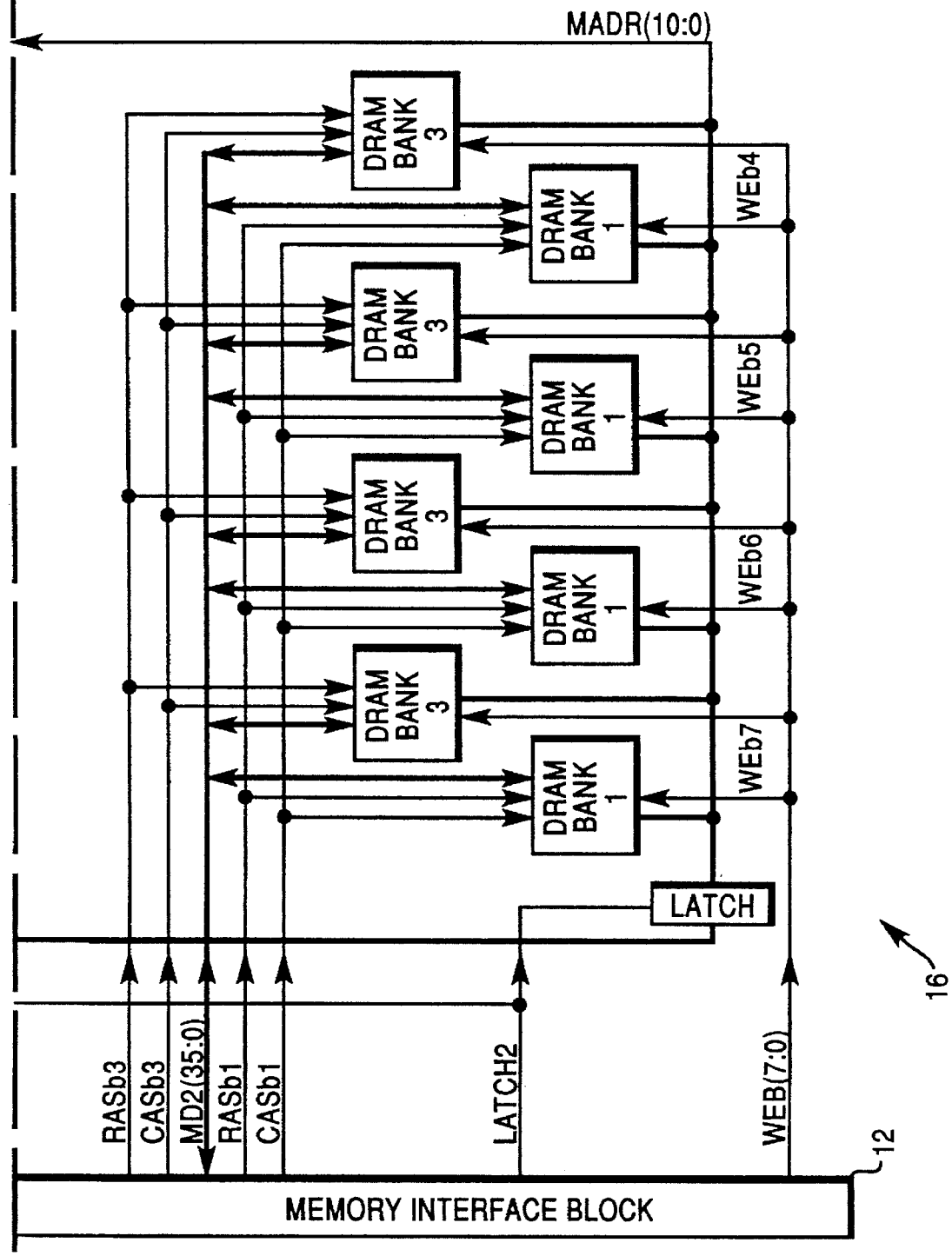

FIGS. 2A-B show greater detail of the DRAM memory banks 16. As shown, there are four memory banks (Banks 0, 1, 2, 3). Each bank includes four slots. For example, bank 0 includes slots 28a, 28b, 28c and 28d. Each slot is represented schematically by its connecting data, address and control lines. For example, slot 28a of bank 0 is connected to row address strobe (RASb0), column address strobe (CASb0), and write enable (WEb3) control lines, eleven memory address lines (MADR(10:0)), and nine data lines (MD1(35:27)).

Each slot in a DRAM bank is connectable to DRAM chip. Each DRAM chip is nine bits wide (eight data and one parity bit). According to the described embodiment, data is transferred into and out of the memory on a 32 bit-wide bus. Thus, if a given bank has any chips connected, it must be completely populated by chips. In addition, all of the chips in a given bank must have the same capacity although chips in different banks may have different capacities. Another requirement of the system is that chips are connected from the lowest numbered bank to the highest. Obviously, bank 0 will always be populated by chips with banks 1, 2 and 3 being available for expansion.

FIGS. 3A-B illustrate some possible memory configurations for the present invention. FIG. 3C shows the memory bank and slot order for the configuration shown in FIGS. 3A-3B. Note that in FIGS. 3A-B, "Q" represents a 256 KByte chip, "1" represents a 1 MByte chip and "4" represents a 4 MByte chip. Consider the following representative examples. Example 1: a 1 MByte configuration includes four 256 KByte chips connected to bank 0 slots 1, 2, 3 and 4, respectively, (slots 28a, 28b, 28c and 28d in FIG. 2A).

Example 2: a 28 MByte configuration might include 1 MByte chips populating banks 0, 1 and 2, and 4 MByte chips populating bank 3.

Figure 4:
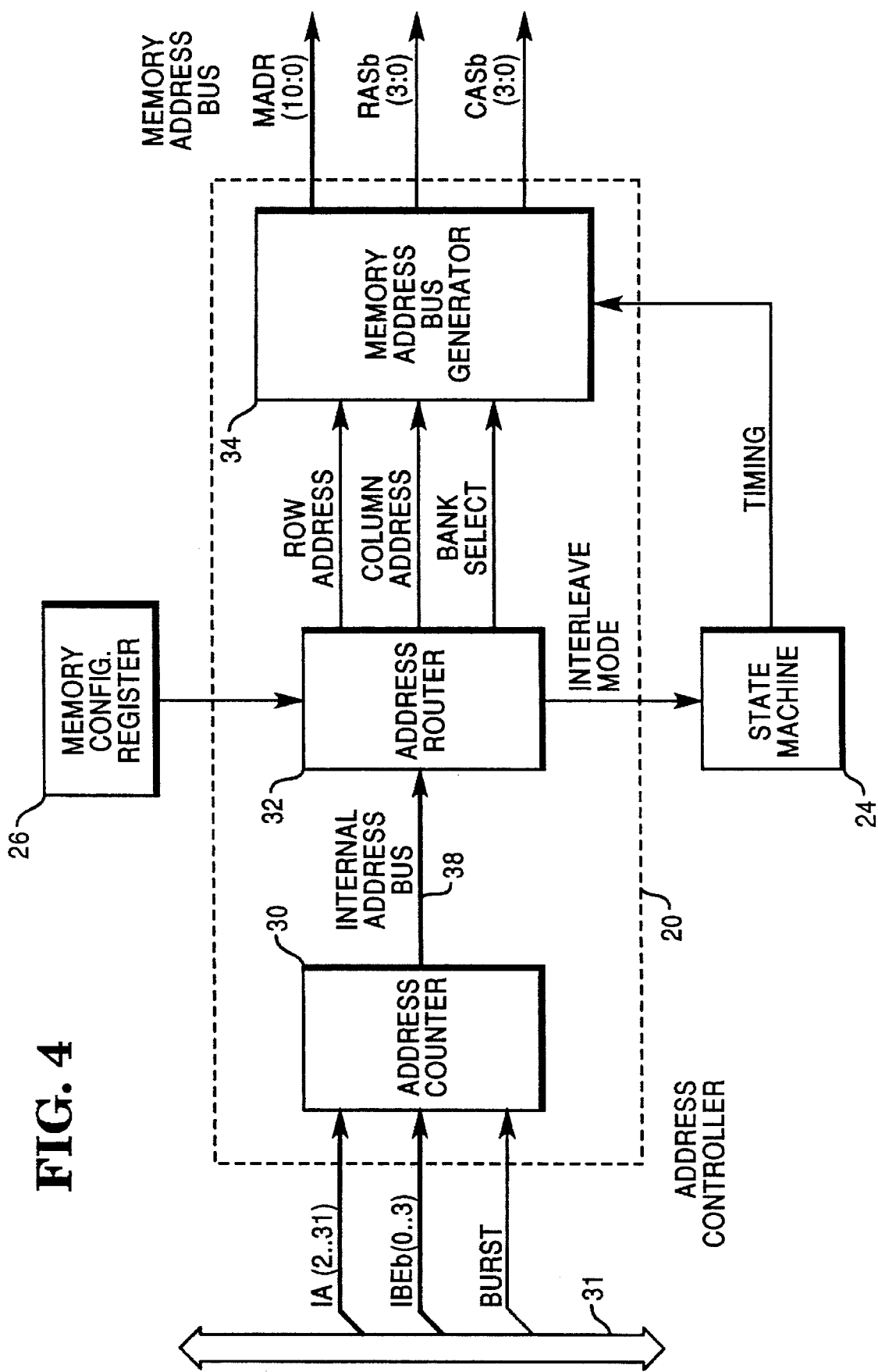
FIG. 4 is a block diagram of the address controller shown in FIG. 1.

FIG. 4 shows address controller 20 which includes an address counter 30, address router 32 and memory address bus generator 34. Address counter 30 is connected to an internal transaction bus 31 and receives an incoming address IA(2..31), a byte enable IBEb(0..3) signal, and a BURST signal. The byte enable signal IBEb(0..3) allows individual bytes in a four-byte long word to be accessed.

The BURST signal indicates that a "streaming mode" access with the microchannel is being requested. Streaming mode provides a starting address for a corresponding data element. Sequential addresses for sequential data are provided by counter 30. When no BURST signal is received, address counter 30 transfers all incoming addresses to router 32. However, when the BURST signal is received, address counter 30 increments the starting address on subsequent clock cycles and provides the sequential or incremented addresses to router 32. In short, counter 30 provides addresses to facilitate a streaming mode access with microchannel.

Figure 5:
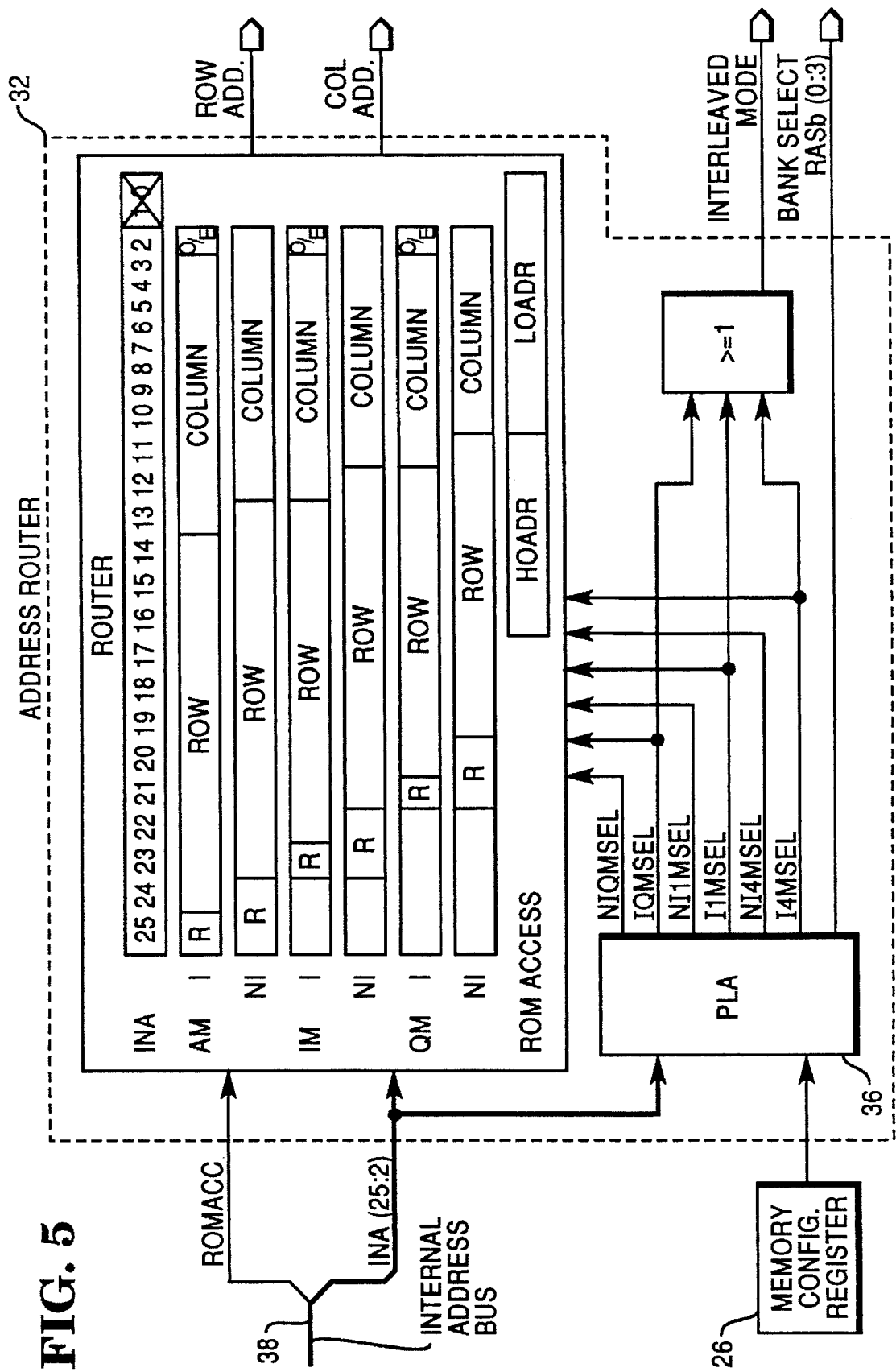
FIG. 5 is a block diagram of the address router shown in FIG. 4.

FIG. 5 shows address router 32 in greater detail. Router 32 includes a programmable logic array 36 which is connected to memory configuration register 26 and which is further connected to the internal address bus 38 for receiving address INA(25:2).

FIG. 6 shows memory configuration register 26 which is an eight bit register. During system initialization register 26 is provided with data representing the capacity of each bank. Bits 0 and 1 are reserved for the capacity of bank 0, bits 2 and 3 are reserved for the capacity of bank 1, bits 4 and 5 are reserved for the capacity of bank 2, bits 6 and 7 are reserved for the capacity of bank 3. The code for the bits is (0,0) for no chips attached to the designated bank, (0,1) for 256 KB chips attached to the designated bank, (1,0) for 1 MB chips attached to the designated bank, (1,1) for 4 MB chips attached to the designated bank.

Referring again to FIG. 5, PLA 36 receives memory capacity information from register 26 and address INA (25:2) from address counter 30. PLA 36 compares the capacity of each bank to determine whether or not addresses are to be interleaved between a pair of banks. Consider the following examples. Example 1: if the capacity of banks 0 and 1 are each 1 MByte, any address between 0 and 2M will be interleaved between the two banks. Example 2: if the capacity of banks 0 and 1 is the same, bank 2 is populated with memory chips and bank 3 is empty, addresses in the range of banks 0 and 1 are interleaved and addresses in the range of bank 2 are non-interleaved. Example 3: if bank 0 has a capacity of 4 MBytes and bank 1 has a capacity of 16 MBytes, there is no interleaving between banks 0 and 1 and an incoming address between 0 and 4M will be directed to bank 0 and an address between 4 and 20M will be directed to bank 1. If banks 2 and 3 each have a capacity of 16 MBytes, addresses between 20 and 52M will be interleaved between banks 2 and 3.

PLA 36 generates a bank select signal RASb(0:3) to select the bank for the incoming address. PLA 36 also generates one of the following six address select (SEL) signals:

NIQMSEL: non-interleaving, bank has 256K chips
IQMSEL: interleaving, bank has 256K chips
NI1MSEL: non-interleaving, bank has 1M chips
IQ1SEL: interleaving, bank has 1M chips
NI4MSEL: non-interleaving, bank has 4M chips
IQ4SEL: interleaving, bank has 4M chips As shown in FIG. 6, the INA(25:2) address has 24 bit positions. Each of the address select signals assigns predetermined bit positions to the row address and column address. It will be appreciated that this assignment is a function of the absolute and relative bank capacities. For example, if bank 0 is populated with 256 KByte chips and bank 1 is populated with 1 MByte chips, the relative capacity of the banks is different, if the address INA(25:2) is for bank 1, the NI1MSEL signal is asserted. The notation "NI" reflects the difference in relative capacities between banks and "1M" reflects the absolute capacity of bank 1. Router 32 uses the NI1MSEL signal to assign bits 2–11 to the column address and bits 12–21 to the row address. As a further example, if banks 0 and 1 are both populated with 256 KByte chips and the address INA(25:2) is within the range of these banks, the IQMSEL signal is generated. The notation "I" reflects equality in the relative capacities and "QM" is a reflection of the absolute capacities of the bank. Router 32 uses the IQMSEL signal to assign bits 3–11 to the column address and bits 12–20 to the row address.

Address router 32 in FIG. 5 also receives ROM Access signal (ROMACC) which indicates if the ROM BIOS (shown in FIG. 2A) is being addressed. If so, the allocation of address bits is shown by high order address (HOADR) and low order address (LOADR).

Whenever PLA 36 determines addresses are to be interleaved, router 32 generates an interleave mode signal which is provided to the state machine 24 (FIG. 4) to control the timing of memory accesses. As is well known in the art, interleaved memory accesses are generally faster than non-interleaved accesses. Thus, timing is a function of whether or not interleave accesses are occurring.

In operation, information on the capacity of each memory bank is stored in memory configuration register 26. The capacity information can be written to the register by a system processor. The information will typically be available to the processor by reading preset switches or by testing memory capacity during an initialization routine.

Address counter 30 receives an incoming address IA(2..31) and also checks for a BURST signal. (FIG. 4) If no BURST signal is provided, the incoming address is transferred to address router 32 over internal address bus 38. PLA 36 uses the capacity information in register 26 to determine whether or not the address is to be interleaved. (FIG. 5). From the bank capacity and whether the banks are to be interleaved, a row and column address is generated from selected bit positions of the address. The column and row addresses are then provided to the DRAM memory to access data.

Referring again to FIG. 4, if address counter 30 receives a BURST signal along with the incoming address, the incoming address is transferred to internal address bus 38. Subsequently, counter 30 generates sequential addresses without responding to a further incoming address from bus 31. The number of sequential addresses generated will normally be limited to a predetermined number.

An important feature of the present invention should now be clear, namely, streaming mode accesses across memory bank boundaries are allowed, irrespective of whether the memory banks are interleaved.

It will be clear to those skilled in the art that the present invention is not limited to the specific embodiment disclosed and illustrated herein.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A computer memory system comprising:

a plurality of memory banks;

a register for storing data representing the capacity of each bank; and a controller connected to said register and banks for determining, from the data stored in said register, whether or not addresses are to be interleaved between a pair of banks, said controller comprising:

an address router for receiving a first address having a plurality of bit positions and for assigning said bit positions to row and column addresses in response to the capacity of each bank stored in the register.

2. The system of claim 1 wherein addresses are interleaved between a pair of banks having the same capacity.

3. The system of claim 2 wherein addresses are non-interleaved within at least a third bank.

4. The system of claim 1 wherein each of said banks has a plurality of slots, each slot being connectable to a memory chip.

5. The system of claim 4 wherein the slots in a given bank are empty or connected to chips having the same capacity.

6. The system of claim 1 wherein said address router generates an interleave mode signal to control the timing of memory accesses.

7. The system of claim 1 wherein said router generates a bank select signal to select one of said banks.

8. The system of claim 1 wherein said controller further comprises:

an address counter connected to said router for receiving an incoming address and burst signal and generating said first address and a plurality of sequential addresses therefrom.

9. A computer memory system comprising:

a plurality of memory banks, each of said banks having a plurality of slots, each slot being connectable to a memory chip, and each slot in a given bank being connected to chips having the same capacity;

a register for storing data representing the capacity of each bank; and a controller connected to said register and banks for determining, from the data stored in said register, whether or not addresses are to be interleaved between a pair of banks, said controller including:

an address router for receiving a first address having a plurality of bit positions and for assigning said bit positions to row and column addresses in response to data stored in said register; and an address counter connected to said router for receiving an incoming address and burst signal and generating said first address and a plurality of sequential first addresses therefrom.

10. The system of claim 9 wherein said address router generates an interleave mode signal to control the timing of memory accesses and a bank select signal to select one of said banks.

11. The system of claim 10 wherein addresses are interleaved between a pair banks having the same capacity and are non-interleaved in at least a third bank.

* * * * *